United States Patent
Shin

(10) Patent No.: US 12,456,931 B2
(45) Date of Patent: Oct. 28, 2025

(54) POWER SUPPLY, ELECTRONIC DEVICE, AND METHOD FOR CONTROLLING SAME

(71) Applicant: SAMSUNG ELECTRONICS CO., LTD., Suwon-si (KR)

(72) Inventor: Jonghyun Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 18/198,603

(22) Filed: May 17, 2023

(65) Prior Publication Data

US 2023/0291331 A1 Sep. 14, 2023

Related U.S. Application Data

(63) Continuation of application No. PCT/KR2022/001343, filed on Jan. 26, 2022.

(30) Foreign Application Priority Data

Feb. 19, 2021 (KR) .................. 10-2021-0022734

(51) Int. Cl.
*H02P 6/16* (2016.01)
*H02M 1/42* (2007.01)
(Continued)

(52) U.S. Cl.
CPC ..... *H02M 7/53875* (2013.01); *H02M 1/4266* (2013.01); *H02P 27/08* (2013.01)

(58) Field of Classification Search
CPC .. H02P 27/08; H02P 27/06; H02P 6/24; H02P 21/22; H02P 27/04; H02P 29/00; H02P 2201/03

See application file for complete search history.

(56) References Cited

U.S. PATENT DOCUMENTS 7,409,737 B2   8/2008   Cho et al.
8,436,590 B2   5/2013   Funaba et al.
(Continued)

FOREIGN PATENT DOCUMENTS

EP   2 835 538 B1   9/2017
EP   3229368 A1 * 10/2017   .............. F24F 11/89
(Continued)

OTHER PUBLICATIONS

International Search Report dated May 16, 2022 issued in PCT/KR2022/001343.
(Continued)

*Primary Examiner* — Karen Masih
(74) *Attorney, Agent, or Firm* — STAAS & HALSEY LLP

(57) ABSTRACT

An electronic device comprises: a rectifying unit to rectify an input alternating current voltage; a converter to convert the rectified input alternating-current voltage into a direct-current voltage; an inverter including a plurality of switching elements to convert the direct-current voltage into a three-phase alternating current voltage and outputting the three-phase alternating current voltage to a load; a DC link unit located between the converter and the inverter; and a control unit to control the inverter to convert the direct-current voltage into the three-phase alternating-current voltage according to a pulse width modulation (PWM) control signal. The control unit reduces the speed of a load in response to the detecting of a stop signal with respect to the PWM control signal and controls the load to stop a driving of the load in response to the detecting of a change in the link voltage of the DC link unit.

16 Claims, 8 Drawing Sheets

(51) Int. Cl.
    *H02M 7/5387*    (2007.01)
    *H02P 27/08*    (2006.01)

(56)    References Cited

U.S. PATENT DOCUMENTS

| | | | |
|---|---|---|---|
| 9,075,089 | B2 | 7/2015 | Sakakibara |
| 9,534,823 | B2 | 1/2017 | Park et al. |
| 9,605,686 | B2 | 3/2017 | Hamada et al. |
| 10,003,296 | B2 | 6/2018 | Bae et al. |
| 10,077,910 | B2 | 9/2018 | Lee et al. |
| 10,924,041 | B2 | 2/2021 | Shinoda et al. |
| 11,177,758 | B2 | 11/2021 | Lee |
| 11,258,393 | B2 | 2/2022 | Jung et al. |
| 2018/0166978 | A1* | 6/2018 | Lim ............... H02M 7/06 |

FOREIGN PATENT DOCUMENTS

| | | |
|---|---|---|
| EP | 2 284 982 B1 | 5/2018 |
| JP | 2008-113481 | 5/2008 |
| JP | 2011-199996 | 10/2011 |
| JP | 2016-59085 | 4/2016 |
| JP | 2019-92239 | 6/2019 |
| KR | 10-2004-0045728 | 6/2004 |
| KR | 10-0595539 | 6/2006 |
| KR | 10-0733313 | 6/2007 |
| KR | 10-2012-0134904 | 12/2012 |
| KR | 10-2013-0043531 | 4/2013 |
| KR | 10-1375392 | 3/2014 |
| KR | 102526874 B1 * | 4/2016 |
| KR | 10-2016-0070548 | 6/2016 |
| KR | 10-2017-0002349 | 1/2017 |
| KR | 10-2017-0122057 | 11/2017 |
| KR | 10-1804339 | 12/2017 |
| KR | 10-1887864 | 9/2018 |
| KR | 10-1939474 | 1/2019 |
| KR | 10-2020-0046848 | 5/2020 |
| KR | 10-2020-0145112 | 12/2020 |

OTHER PUBLICATIONS

Written Opinion dated May 16, 2022 issued in PCT/KR2022/001343.
Office Action dated Mar. 24, 2025 issued in Korean Patent Application No. 10-2021-002734.

* cited by examiner

POWER SUPPLY, ELECTRONIC DEVICE, AND METHOD FOR CONTROLLING SAME

CROSS-REFERENCE TO RELATED APPLICATIONS

This application is a continuation application, under 35 U.S.C. § 111(a), of International Patent Application No. PCT/KR2022/001343, filed on Jan. 26, 2022, which claims the priority benefit of Korean Patent Application No. 10-2021-0022734, filed on Feb. 19, 2021 in the Korean Patent and Trademark Office, the disclosures of which are hereby incorporated by reference in their entirety.

BACKGROUND

Field

The disclosed invention relates to a power supply including an inverter and a method of controlling the same.

Description of Related Art

In general, a power supply may include a plurality of switching elements. The plurality of switching elements may be located in a converter to convert an AC voltage into a DC voltage and may be located in an inverter to convert a DC voltage into a three-phase voltage.

An inverter is a device which converts power supplied from the outside into AC power suitable for a load and is used in various electronic devices.

The inverter converts power according to various kinds of schemes. For example, the inverter may provide power by controlling a duty ratio of a pulse width modulation (PWM) signal.

In this case, the inverter serves as a buffer between the external power source and the inverter through a DC linker, and it is common to use a plurality of capacitors having a large capacity in the DC linker.

In the above case, even when the PWM control signal is cut off, the capacitor is sufficient to accommodate the remaining power. However, in a case where the DC linker is composed of a single capacitor having a small capacity, a problem with durability of the element may occur.

SUMMARY

An electronic device includes: a rectifier that rectifies an input alternating current (AC) voltage; a converter that converts the rectified input AC voltage into a direct current (DC) voltage; an inverter including a plurality of switching elements to convert the DC voltage into a three-phase AC voltage and to output the converted three-phase AC voltage to a load; a DC linker positioned between the converter and the inverter; and a controller that controls the inverter to convert the DC voltage into the three-phase AC voltage according to a pulse width modulation (PWM) control signal. The controller controls the load to reduce a speed of the load upon detecting a stop signal for the PWM control signal and to stop a driving of the load upon detecting a change in a link voltage of the DC linker.

The controller may control the load to stop the driving of the load in response to the link voltage of the DC linker being a minimum value.

The controller may detect a phase of the input voltage supplied from the outside and determine a minimum value of the link voltage based on the detected phase.

The controller may detect a phase of an input power based on any one phase of the three-phase AC voltage of the input power.

The link voltage may have the minimum value at a specific phase of the voltage of the reference phase.

The controller may control the load to stop the driving of the load at a specific phase of a voltage of the reference phase after reducing the speed of the load, upon detecting a stop signal for the PWM control signal.

The converter may be connected to the DC linker to boost the link voltage.

The converter may include a power factor correction (PFC) circuit including an inductor.

The controller may reduce the speed of the load, and stop a driving of the PFC circuit after a predetermined time has elapsed, upon detecting the stop signal for the PWM control signal.

The controller may control the load to stop the driving of the load in response to detecting that the link voltage of the DC linker is the minimum value after the driving of the PFC circuit is stopped.

A method of controlling an electronic device including a rectifier that rectifies an input alternating current (AC) voltage, a converter that converts the rectified input AC voltage into a direct current (DC) voltage, and an inverter that converts the AC voltage into a three-phase AC voltage according to a pulse width modulation (PWM) control signal, the method comprises detecting a stop signal for the PWM control signal; reducing a speed of a load connected to the inverter in response to the detecting of the stop signal; and controlling the load to stop a driving of the load upon detecting a change in a link voltage of a DC linker positioned between the converter and the inverter.

The controlling of the load may include controlling the load to stop the driving of the load in response to the link voltage of the DC linker being a minimum value.

The controlling of the load may include detecting a phase of the input voltage supplied from outside and determining a minimum value of the link voltage based on the detected phase.

The controlling of the load may include detecting a phase of an input power based on any one phase of the three-phase AC voltage of the input power.

The link voltage may have the minimum value at a specific phase of the voltage of the reference phase.

The controlling of the load may include controlling the load to stop a driving of the load at a specific phase of the voltage of the reference phase after reducing the speed of the load, upon detecting a stop signal for the PWM control signal.

The converter may be connected to the DC linker to boost the link voltage.

The converter may include a power factor correction (PFC) circuit including an inductor.

The controlling of the load may include reducing the speed of the load and stopping the driving of the PFC circuit after a predetermined time has elapsed, upon detecting a stop signal for the PWM control signal.

The controlling of the load may include controlling the load to stop the driving of the load in response to detecting that the link voltage of the DC linker is the minimum value after the driving of the PFC circuit is stopped.

DETAILED DESCRIPTION

Like reference numbers indicate like elements throughout the description. This description does not describe all elements of the embodiments, and general content or overlapping content between the embodiments in the technical field to which the disclosed invention belongs is omitted. The term "unit, module, member, or block" used in the description may be implemented as software or hardware, and according to embodiments, a plurality of "units, modules, members, or blocks" may be implemented as one component, or one of "part, module, member, block" may include a plurality of components.

Throughout the description, when a part is said to be "connected" to another part, this includes not only a case of being directly connected but also a case of being indirectly connected, and the indirect connection includes being connected through a wireless communication network.

In addition, when a part is said to "include" a certain component, this means that it may further include other components without excluding other components unless otherwise stated.

Throughout the description, when a member is said to be located "on" another member, this includes not only a case where a member is in contact with another member, but also a case where another member is present between the two members.

Terms such as first and second are used to distinguish one component from another, and the components are not limited by these terms.

Expressions in the singular form include the plural form unless the context clearly indicates otherwise.

In each operation, the identification code is used for convenience of description, and the identification code does not describe the order of each operation, and each operation may be performed in a different order from the specified order unless a specific order is clearly described in context.

Hereinafter, embodiments according to the disclosed invention will be described in detail with reference to the accompanying drawings.

One aspect of the present disclosure is to provide an electronic device capable of preventing an overvoltage from being applied to a capacitor element in a case where a PWM control signal is blocked in an inverter using a small-capacity capacitor, and a method of controlling the same.

In accordance with one aspect of the present disclosure, it is possible to prevent overvoltage from being applied to a capacitor element when a PWM control signal is blocked in an inverter using a small-capacity capacitor, and it is possible to ensure the durability of each element of the inverter.

Figure 1:
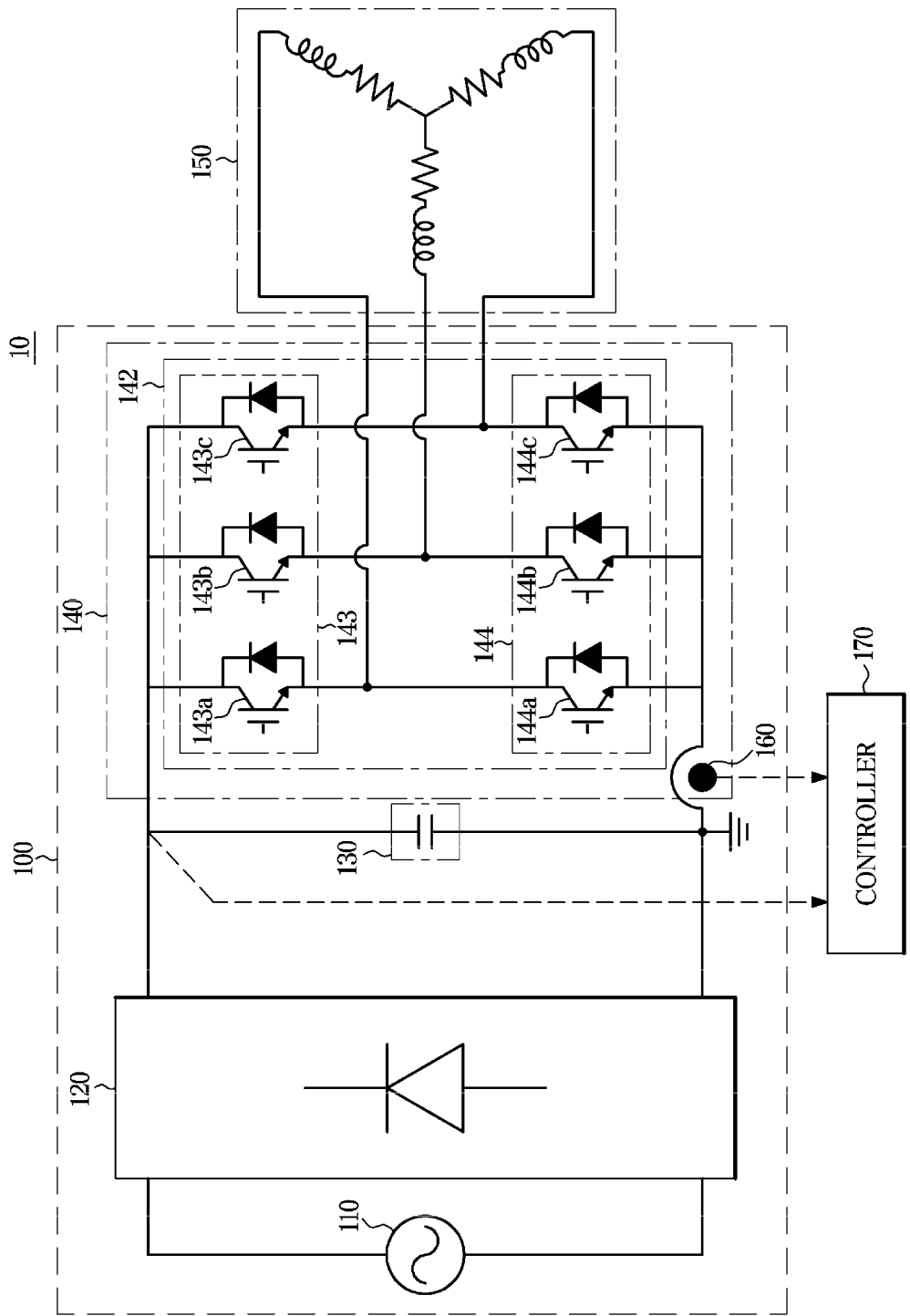
FIG. 1 is a block diagram of an electronic device including an inverter according to one embodiment.
Figure 2:
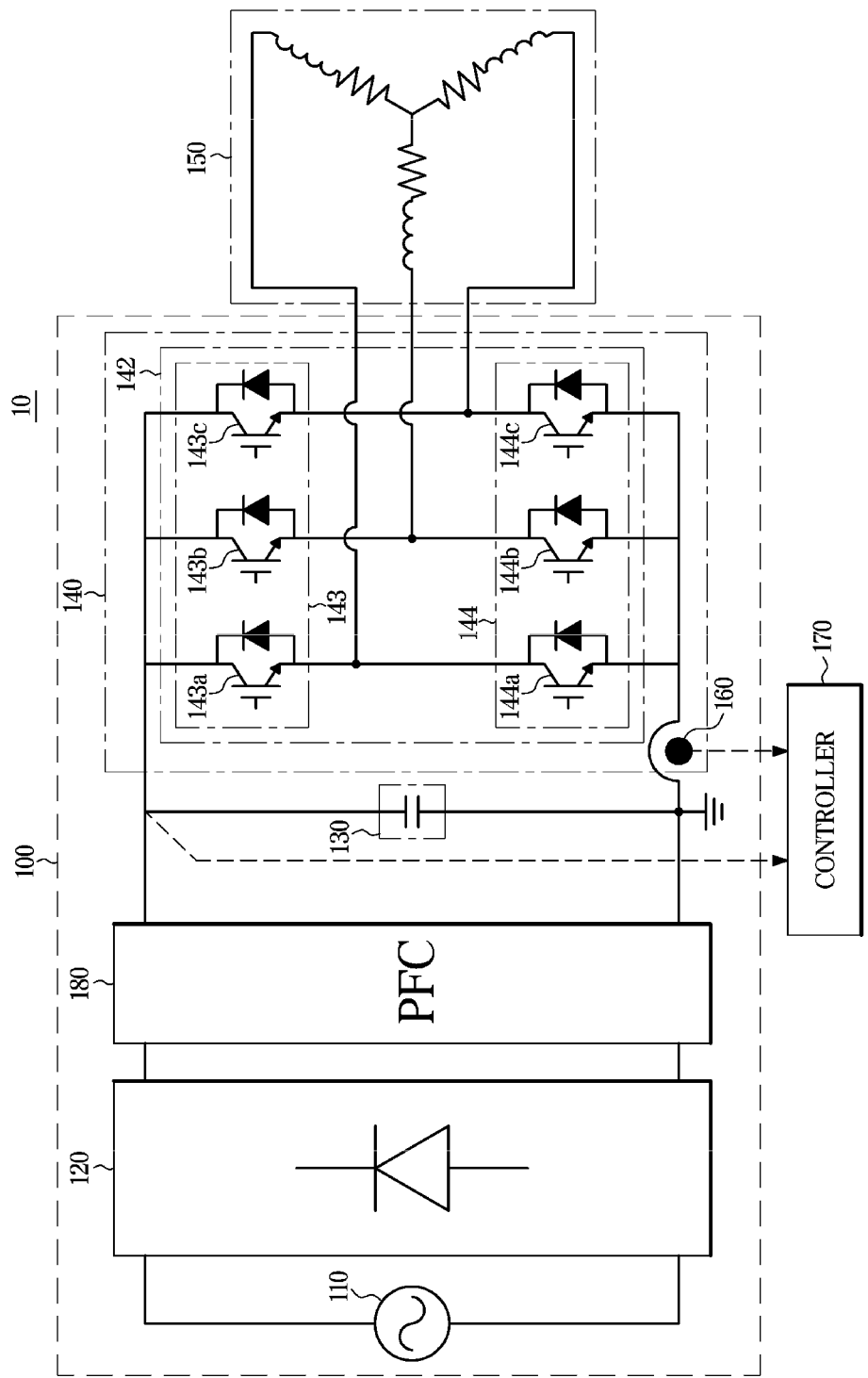
FIG. 2 is a block diagram of an electronic device including an inverter according to another embodiment.

FIG. 1 is a block diagram of an electronic device including an inverter according to one embodiment, and FIG. 2 is a block diagram of an electronic device including an inverter according to another embodiment.

An electronic device 10 includes a power supply 100, an external power source 110, a rectifier 120, an inverter 140, a load 150, a current sensor 160, and a controller 170.

The electronic device 10 may be, for example, a washing machine, a refrigerator, or an air conditioner, and the electronic device 10 may include a motor and a compressor. However, the load 150 is exemplified as a motor or a compressor but is not limited thereto and may be any suitable load.

The inverter 140 receives a DC voltage and outputs the same to the load 150 as a three-phase AC voltage. The DC voltage refers to the conversion of an AC voltage supplied through the external power source 110 into a DC voltage by the rectifier 120. For example, the rectifier 120 may supply DC power to the inverter 140 by rectifying and smoothing an AC current of a magnitude obtained from a power outlet at home.

The inverter 140 includes a main circuit 142.

The main circuit 142 includes an upper arm 143 and a lower arm 144. The upper arm 143 includes three switching elements 143a to 143c. The lower arm 144 includes three switching elements 144a to 144c. The switching elements 143a to 143c and 144a to 144c are connected in a 3-phase bridge configuration to convert the DC voltage input from the rectifier 120 into the 3-phase AC voltage and output the same to the load 150. The switching elements 143a to 143c and 144a to 144c are generally power switching elements, insulated gate bipolar transistors (IGBTs), but are not limited thereto and may be any suitable semiconductor switching elements. Flywheel diodes are connected in reverse-parallel to the switching elements 143a to 143c and 144a to 144c.

The controller 170 controls the power output from the main circuit 142 to the load 150 by applying an appropriate control voltage to gates, which are control terminals of the switching elements 143a to 143c and 144a to 144c. For example, the controller 170 controls the switching timing of the switching elements 143a to 143c and 144a to 144c according to the power consumption of the load 150.

The controller 170 may include at least one memory for storing a program for executing the above-described operation and an operation to be described below, and at least one processor for executing the stored program.

Meanwhile, the rectifier 120 is an electrical device for converting AC current into DC current and converts the AC voltage supplied through the external power source 110 into the DC voltage. Both ends of the DC output through the rectifier 120 are referred to as a DC link. In this case, both DC ends are located at both ends of a DC linker 130, and the voltage measured at both DC ends is referred to as a link voltage. The output power provided to the load 150 may vary depending on the link voltage when the resonance curve is the same.

The DC linker 130 serves as a buffer between the external power source 110 and the inverter 140. Specifically, the DC linker 130 may be used to maintain the link voltage converted through the rectifier 120 and supply the link voltage to the inverter 140.

Meanwhile, the DC linker 130 may be composed of a plurality of capacitors, unlike those shown in FIGS. 1 and 2. Conventionally, when a pulse width modulation (PWM) control signal is stopped in the inverter 140, the power emitted by various elements such as the load 150 is able to be accommodated by configuring the DC linker 130 as a plurality and configuring the same with a large-capacity capacitor having a capacitance of about n millifarads (mF).

In this embodiment, to reduce the size and cost of the inverter 140, the inverter 140 is configured with a small-capacity single capacitor having an electrical capacity of n microfarads (μF). However, in this case, when a single capacitor accommodates all of the power emitted from various elements such as the load 150, an excessive regenerative voltage may occur, thereby causing a problem with durability of the element. The present disclosure executes a separate control process upon stopping the PWM control signal to solve the above-mentioned problem, and specific details related to this will be described below.

The current sensor 160 is commonly connected to a plurality of windings to measure the current flowing inside the load 150. The current sensor 160 measures the current flowing inside the load 150 and transmits the measured current to the controller 140 so that the controller 140 can determine the driving speed of the load. For the current sensor 160, current detection sensors are installed on all of a U-phase winding, a V-phase winding, and a W-phase winding to detect the current flowing in each of the U-phase winding, the V-phase winding, and the W-phase winding, or sensors are installed on two phases such as the U-phase winding and the V-phase winding or the V-phase winding and the W-phase winding to detect the current flowing in each winding. In addition, it is possible for the current sensor 160 to use a method of detecting the common current flowing through the plurality of windings and determining the current flowing through each of the plurality of windings based on the sensed current (hereinafter referred to as 'single shunt method') by installing one common current sensor for all the plurality of windings to minimize the cost of installing the plurality of sensors.

Meanwhile, referring to FIG. 2, the power supply 100 may further include a power factor correction (PFC) circuit 180 which is a converter. The PFC circuit 180 may include an inductor to boost the voltage rectified by the rectifier 120 or the link voltage.

Specifically, the PFC circuit 180 may improve a power factor by minimizing reactive power delivered to the load 150 side. In addition, the PFC circuit 180 is a component for driving a variable load.

When the inverter 140 is configured along with the PFC circuit 180, the DC linker 130 is affected by the boosting effect by the PFC circuit 180 in addition to the power emitted from the load 150. Therefore, the inverter 140 according to FIG. 2 may execute a process separate from the controlling method of the inverter 140 according to FIG. 1. This will be described below with reference to FIGS. 7 and 8.

Figure 3:
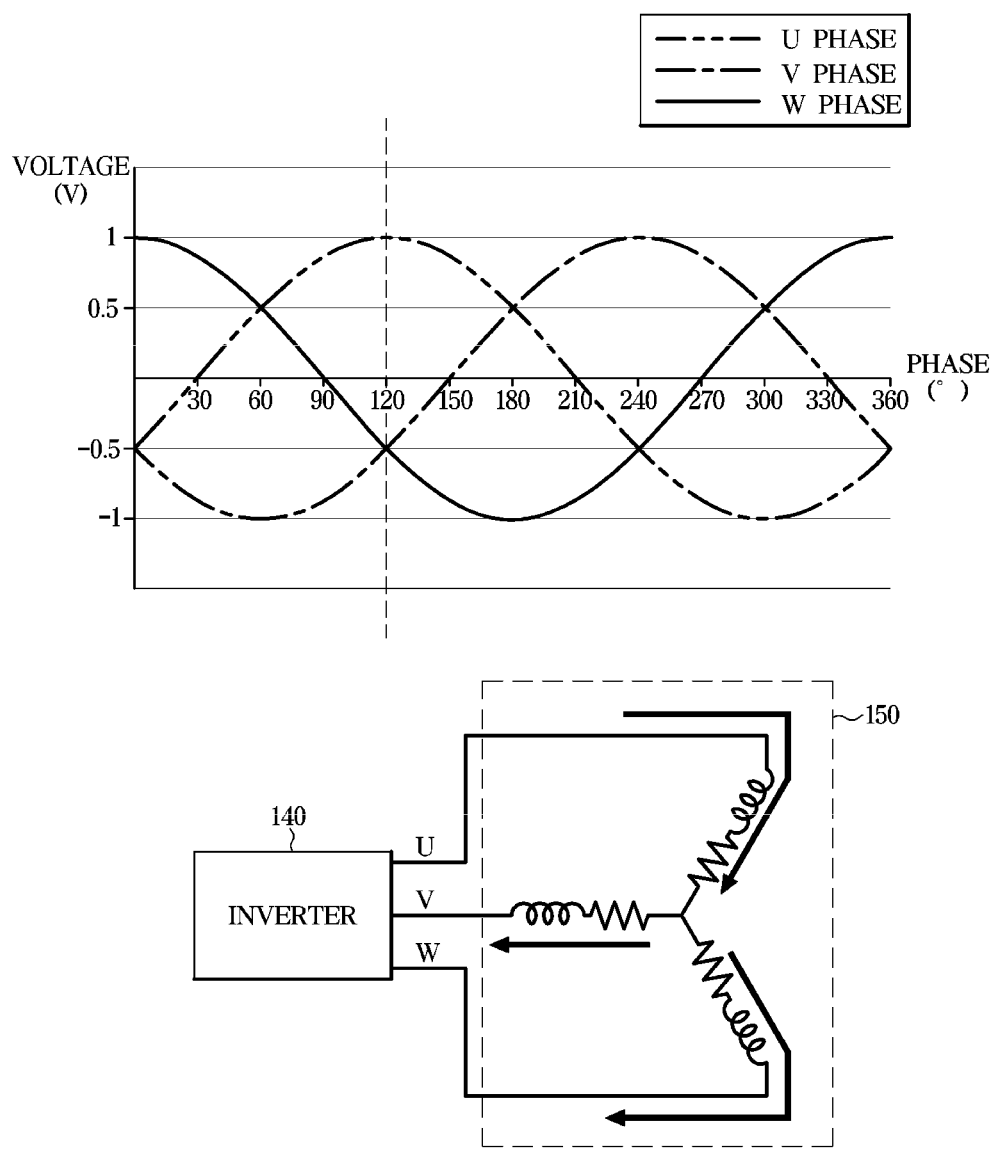
FIG. 3 shows a specific phase of a three-phase voltage vector of input power and the resulting current flow.

FIG. 3 shows a specific phase of a three-phase voltage vector of the input power and the resulting current flow.

Referring to FIG. 3, the electronic device 10 (see FIG. 1) may control the inverter 140 so that the vector of the three-phase voltage applied to the plurality of windings included in the load 150 (see FIG. 1) has a phase of 120°. The inverter 140 may include a plurality of switching elements, and the controller 170 may control the duty ratio of a PWM signal applied to the plurality of switching elements so that the vector of the three-phase voltage has a phase of 120°.

For example, when the vector of the 3-phase voltage applied to the plurality of windings is 120°, the voltage to be applied to phase U is 1 V, the voltage to be applied to phase V is −0.5 V, and the voltage to be applied to phase W is also −0.5 V. In this case, the duty ratio of the PWM signal applied to the switching element corresponding to the U phase among the three phases (hereinafter 'U phase switching element') may be about 70%, and the duty ratio of the PWM signal applied to the switching elements corresponding to the V phase and the W phase (hereinafter, 'V-phase switching element' and 'W-phase switching element') may be about 40%. Since the above duty ratios may be changed according to other factors such as the magnitude of the voltage vector of the three-phase voltage, it should be understood that the duty ratio exemplified above is simply an example for describing the present disclosure.

In other words, when the vector of the three-phase voltage is 120°, the duty ratio of the PWM signal applied to the U-phase switching element is greater than the duty ratio of the PWM signal applied to the V-phase switching element and the W-phase switching element, and the duty ratio of the PWM signal applied to the V-phase switching element and the W-phase switching element are substantially the same.

The current flows through the winding connected to the U-phase switching element (hereinafter referred to as 'U-phase winding'), through the winding connected to the V-phase switching element (hereinafter referred to as 'V-phase winding'), and through the winding connected to the W-phase switching element (hereinafter referred to as 'W-phase winding'). In other words, the current flows in all of the U-phase winding, the V-phase winding, and the W-phase winding.

Figure 4:
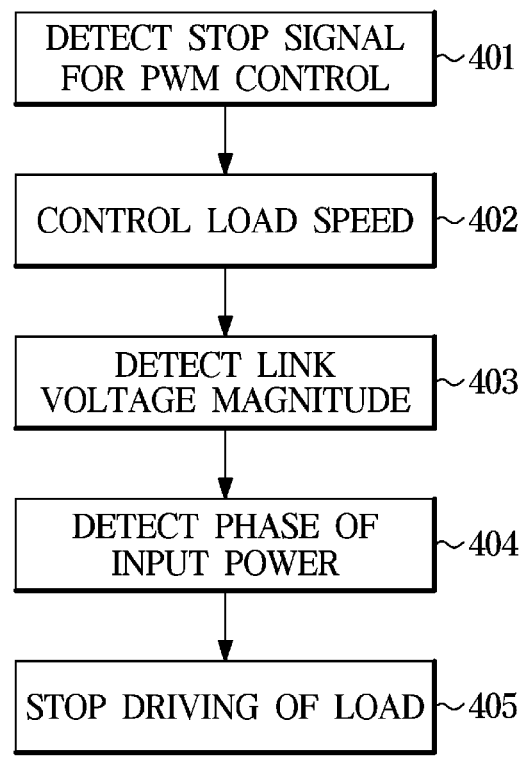
FIG. 4 is a flowchart of a method of controlling an inverter according to one embodiment.
Figure 5:
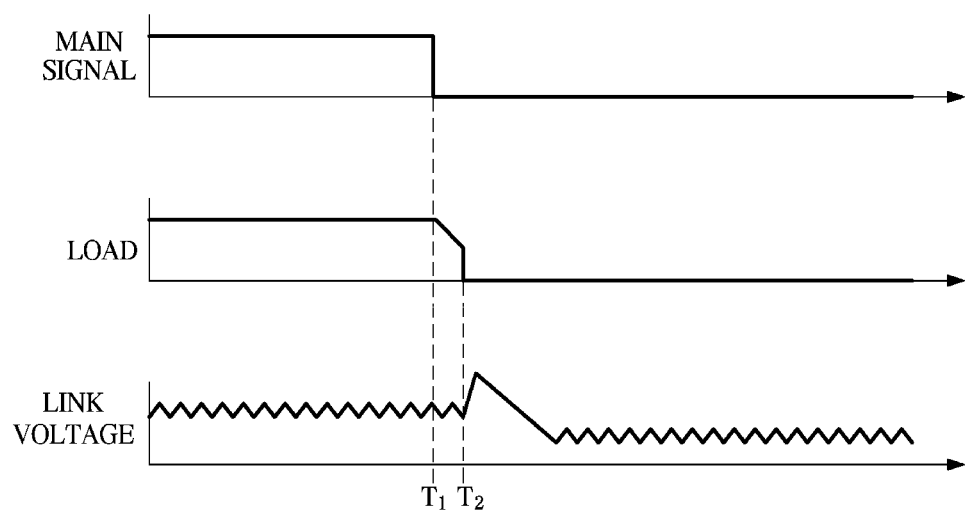
FIG. 5 is a diagram for describing load driving control with respect to a link voltage.
Figure 6:
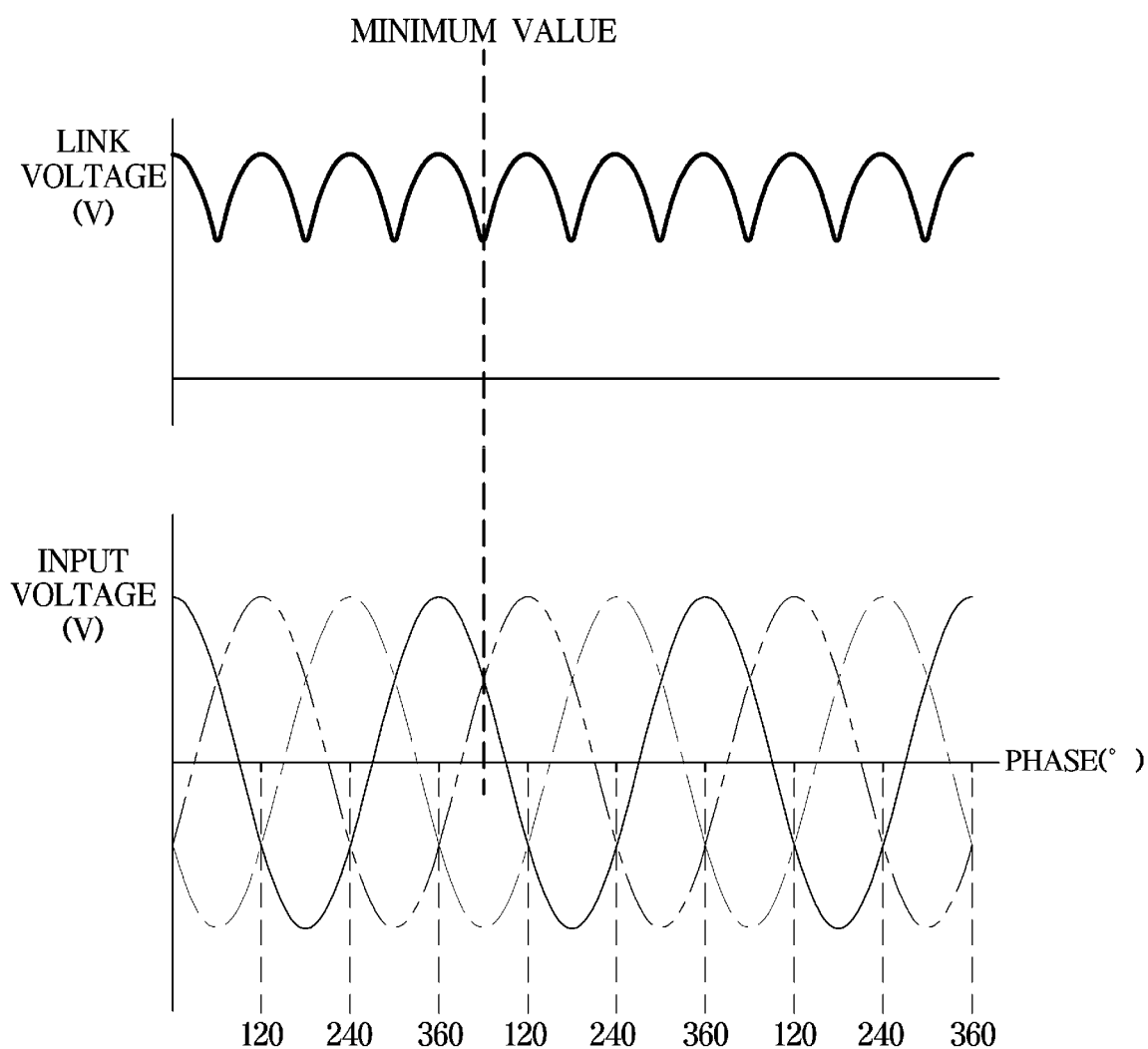
FIG. 6 is a diagram for describing a relationship between the link voltage and a phase of input power.

FIG. 4 is a flowchart of a method of controlling an inverter according to one embodiment, FIG. 5 is a diagram for describing load driving control with respect to the link voltage, and FIG. 6 is a diagram for describing a relationship between the link voltage and a phase of input power. The inverter controlling method according to FIG. 4 will be described with reference to FIGS. 5 and 6 together. However, this is only a preferred embodiment for achieving the object of the present disclosure and some operations may be added or deleted as needed.

The controller 170 detects a stop signal for PWM control (401).

As a prerequisite to operation 401, the inverter 140 receives a PWM control signal from the controller 170. The inverter 140 converts input power according to the PWM control signal output from the controller 170 and generates an output voltage applied to the load 150. The output voltage of the inverter 140 is controlled based on a command signal input to control driving of the load 150 and the current detected by the current sensor 160. In this case, the inverter 140 may be a voltage source inverter (VSI) or a current source inverter (CSI).

As described above, the inverter 140 is a PWM inverter and is driven by a pulse width modulation scheme. Accordingly, the switching element of the inverter 140 is switched on/off according to the PWM control signal, and the magnitude and frequency of the output voltage output from the inverter 140 are controlled by the controller 170 modulating the on/off pulse width of the PWM control signal. The inverter 140 supplies the output voltage generated according to the PWM control signal to the load 150.

The current sensor 160 detects the current of the load 150 being driven. The controller 170 obtains a current harmonic distortion rate based on the current detected in real time by the current sensor 160 and determines a pulse width modulation scheme based on the obtained current harmonic distortion rate so that the controller 170 may adaptively change the pulse width modulation scheme according to the change in the switching frequency of the inverter 140 and the output voltage of the load 150. The current sensor 160 may be implemented as a shunt resistor or a current transformer.

In this case, the controller 170 may stop driving the load 150 in response to a main signal (see FIG. 5). In this case, the controller 170 may cut off the power supplied to the load 150 based on the stop signal for PWM control. In this case, when the PWM signal is cut off without a separate sequence in the inverter 140, the DC linker 130 generates a regenerative voltage by a counter electromotive force generated from the load 150.

Accordingly, the controller 170 controls the speed of the load 150 (402) to minimize the regenerative voltage of the DC linker 130. For example, when the load is a motor, the speed of the load may be the number of rotations per minute of the motor and is proportional to the power supplied to the load 150. Accordingly, the magnitude of the counter electromotive force generated by the load 150 may be proportional to the speed of the load. Referring to FIG. 5, the controller 170 may reduce the speed of the load 150 to a predetermined level in response to the main signal being turned off. As the speed of the load 150 decreases, the magnitude of the counter electromotive force generated by the load 150 decreases, and a smaller regenerative voltage may be applied to the DC linker 130 than a case where the PWM control is momentarily stopped.

Meanwhile, as shown in FIG. 5, the controller 170 completely stops the driving of the load 150 after reducing the speed of the load 150 to a certain level. In this case, the controller 170 may minimize the regenerative voltage applied to the DC linker 130 by matching the timing of completely stopping the driving of the load 150 with the timing of the link voltage of the DC linker 130 having a minimum value. In this case, the controller 170 may stop the driving of the load 150 at the time when the link voltage becomes the minimum value by detecting the magnitude of the link voltage (403).

Meanwhile, the controller 170 may determine the timing when the link voltage becomes the minimum based on the phase of the input power. The controller 170 detects the phase of the input power to determine when the link voltage becomes the minimum value (404).

The relationship between the magnitude of the link voltage and the phase of the input power will be described in detail with reference to FIG. 6.

As shown in FIG. 6, the link voltage changes from a minimum value to a maximum value based on a cycle of any one phase of the three-phase AC voltage of the input power. At this time, the controller 170 may stop the driving of the load 150 at the time of the corresponding phase by using the characteristic that the link voltage has a minimum value in a specific phase of a reference phase voltage. For example, the specific phase may be a phase where the reference phase voltage is maximum after reducing the speed of the load 150.

When the stop signal for the PWM control signal is detected, the controller 170 according to one embodiment reduces the speed of the load 150 and then controls the load 150 to completely stop driving at the specific phase of the reference phase voltage. In this case, since the controller 170 uses the phase information of the input power detected in real time without the need for detecting the magnitude of the link voltage, the timing for completely stopping the driving of the load 150 after detecting the stop signal for PWM control can be shortened.

The controller 170 determines a driving stop timing of the load 150 based on at least one of operations 403 and 404 and then stops driving the load 150 (405).

Meanwhile, the inverter controlling method according to FIG. 4 shows a control process in the inverter 140 without a converter, in other words, a power factor correction (PFC) circuit 180. When the PFC circuit 180 is added to the inverter 140 (see FIG. 2), the regenerative voltage applied to the DC linker 130 becomes relatively large due to the magnetic energy of the inductor included in the circuit itself.

Therefore, when the PFC circuit 180 is present, a separate control process is added, and this will be described with reference to FIGS. 7 and 8.

Figure 7:
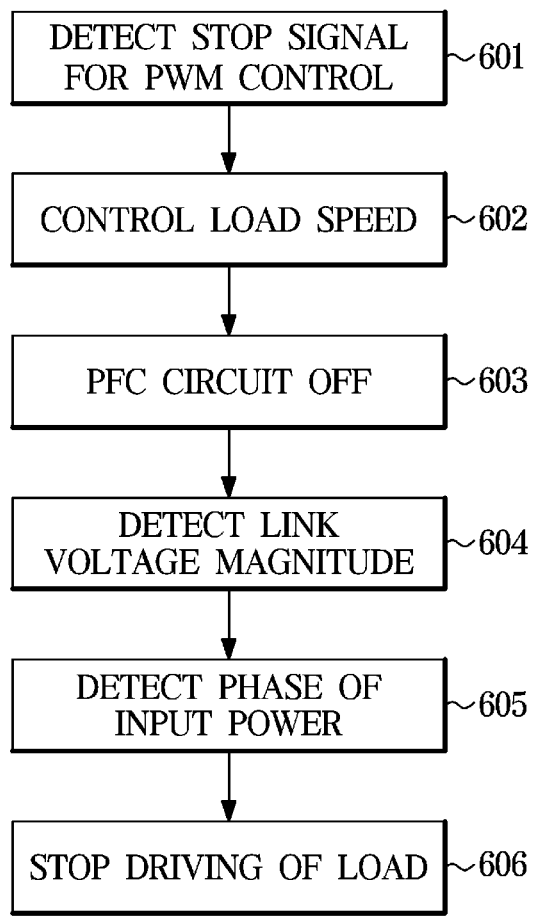
FIG. 7 is a flowchart of a method of controlling an inverter according to one embodiment.
Figure 8:
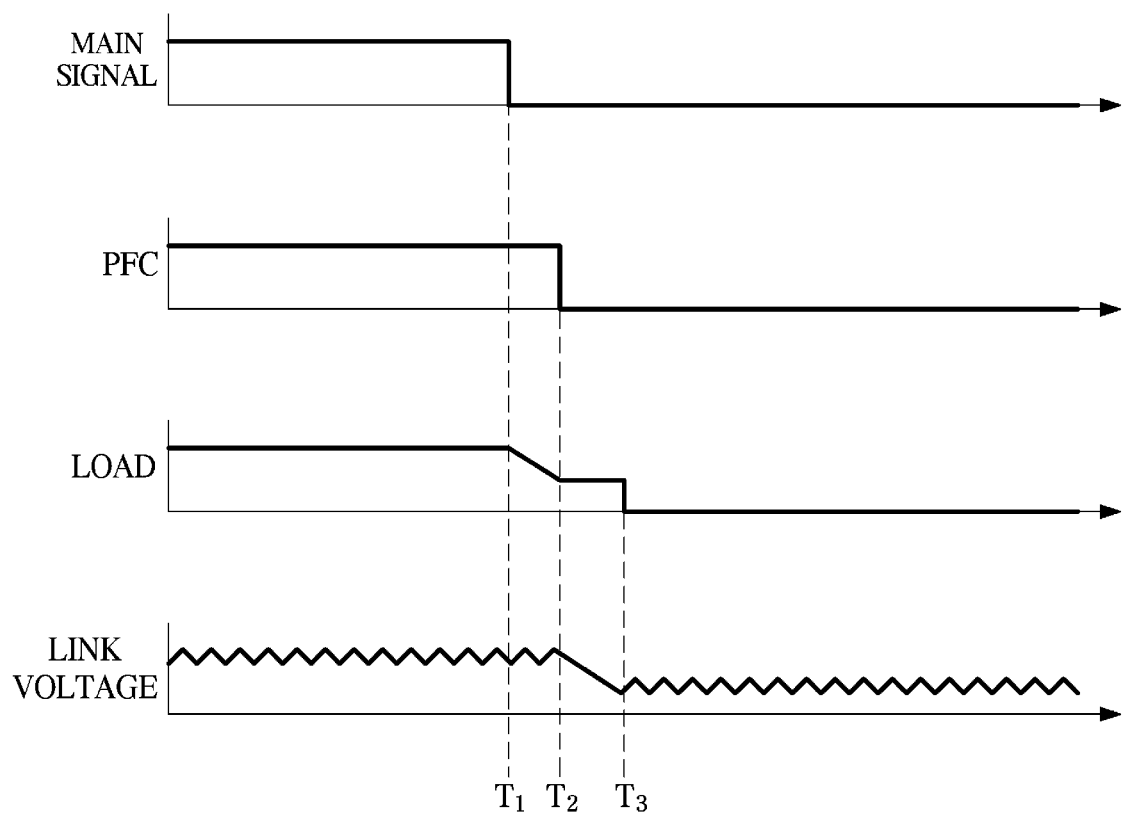
FIG. 8 is a diagram for describing load driving control with respect to a link voltage and a PFC.

FIG. 7 is a flowchart of a method of controlling an inverter according to one embodiment, and FIG. 8 is a diagram for describing load driving control with respect to the link voltage and the PFC. The inverter controlling method according to FIG. 7 will be described with reference to FIG. 8. However, this is only a preferred embodiment for achieving the object of the disclosed invention and some operations may be added or deleted as needed.

The controller 170 detects a stop signal for PWM control (701).

As a prerequisite to operation 701, the inverter 140 receives a PWM control signal from the controller 170. The inverter 140 converts input power according to the PWM control signal output from the controller 170 and generates an output voltage applied to the load 150. The output voltage of the inverter 140 is controlled based on a command signal input to control driving of the load 150 and the current detected by the current sensor 160. In this case, the inverter 140 may be a voltage source inverter (VSI) or a current source inverter (CSI).

As described above, the inverter 140 is a pulse width modulation (PWM) inverter and is driven by a pulse width modulation scheme. Accordingly, the switching element of the inverter 140 is switched on/off according to the PWM control signal, and the magnitude and frequency of the output voltage output from the inverter 140 are controlled by the controller 170 modulating the on/off pulse width of the PWM control signal. The inverter 140 supplies the output voltage generated according to the PWM control signal to the load 150.

The current sensor 160 detects the current of the load 150 being driven. The controller 170 obtains a current harmonic distortion rate based on the current detected in real time by the current sensor 160 and determines a pulse width modulation scheme based on the obtained current harmonic distortion rate so that the controller 170 may adaptively change the pulse width modulation scheme according to the change in the switching frequency of the inverter 140 and the output voltage of the load 150. The current sensor 160 may be implemented as a shunt resistor or a current transformer.

In this case, the controller 170 may stop driving the load 150 in response to a main signal (see FIG. 8). In this case, the controller 170 may cut off the power supplied to the load 150 based on the stop signal for PWM control. In this case, when the PWM signal is cut off without a separate sequence in the inverter 140, the DC linker 130 generates a regenerative voltage by a counter electromotive force generated from the load 150.

Accordingly, the controller 170 controls the speed of the load 150 (602) to minimize the regenerative voltage of the DC linker 130. Referring to FIG. 8, the controller 170 may reduce the speed of the load 150 to a predetermined level in response to the main signal being turned off (T1). As the speed of the load 150 decreases, the magnitude of the counter electromotive force generated by the load 150 decreases, and a smaller regenerative voltage may be applied to the DC linker 130 than a case where the PWM control is momentarily stopped.

Meanwhile, as shown in FIG. 8, the controller 170 completely stops driving the load 150 after reducing the speed of the load 150 to a certain level. In this case, the period in which the speed of the load 150 decreases is from T1 to T2.

As described above, since the inverter 140 according to the present embodiment includes the PFC circuit 180, it is necessary to control the driving of the PFC circuit 180 before the driving of the load 150 is completely stopped.

Accordingly, the controller 170 turns off the PFC circuit 180 after the speed of the load 143 decreases to a predetermined level (603). The controller 170 may detect a stop signal for the PWM control signal and stop driving the PFC circuit 180 after a predetermined time has elapsed. In FIG. 8, the driving of the PFC circuit 180 is stopped at the time T2.

Meanwhile, after the driving of the PFC circuit 180 is stopped, the controller 170 may determine the timing for stopping the driving of the load 150 to completely stop driving the load 150.

In this case, the controller 170 may minimize the regenerative voltage applied to the DC linker 130 by matching the timing of completely stopping the driving of the load 150 with the timing of the link voltage of the DC linker 130 having a minimum value. In this case, the controller 170 may detect the magnitude of the link voltage (604) and stop the driving of the load 150 at the time when the link voltage becomes the minimum value.

Meanwhile, the controller 170 may determine the timing when the link voltage becomes the minimum value based on the phase of the input power. The controller 170 detects the phase of the input power to determine when the link voltage becomes the minimum value (605). In this case, the process of FIG. 6 may be referred to for the relationship between the magnitude of the link voltage and the phase of the input power for determining when the link voltage becomes the minimum value.

Referring to FIG. 8, the controller 170 causes the load 150 to completely stop (T3) when the speed of the load 150 is reduced to a certain level and a predetermined time elapses from the timing when the driving of the PFC circuit 180 is stopped.

When the stop signal for the PWM control signal is detected, the controller 170 according to one embodiment reduces the speed of the load 150 and then controls the load 150 to completely stop driving at a specific phase of the reference phase voltage. In this case, since the controller 170 uses the phase information of the input power detected in real time without the need for detecting the magnitude of the link voltage, the timing for completely stopping the driving of the load 150 after detecting the stop signal for PWM control can be shortened.

The controller 170 determines a driving stop timing of the load 150 based on at least one of operations 604 and 605 and then stops driving the load 150 (606).

Meanwhile, the disclosed embodiments may be implemented in the form of a recording medium storing instructions executable by a computer. Instructions may be stored in the form of program code, and when executed by a processor, operations of the disclosed embodiments can be executed by creating program modules. The recording medium may be implemented as a computer-readable recording medium.

Computer-readable recording media include all types of recording media in which instructions that can be decoded by a computer are stored. For example, there may be a read only memory (ROM), a random-access memory (RAM), a magnetic tape, a magnetic disk, a flash memory, an optical data storage, etc.

The device-readable recording medium may be provided in the form of a non-transitory recording medium. Here, 'non-transitory recording medium' only means that it is a tangible device and does not contain signals (e.g., electromagnetic waves), and it does not distinguish whether the data is semi-permanently stored or temporarily stored in the recording medium. For example, a 'non-temporary recording medium' may include a buffer in which data is temporarily stored.

According to one embodiment, the method according to various embodiments disclosed in this document may be provided by being included in a computer program product. Computer program products may be traded between sellers and buyers as commodities. A computer program product is distributed in the form of a device-readable storage medium (e.g., a compact disc read only memory (CD-ROM)). Alternatively, it can be distributed through an application store (e.g., Play Store™) or by direct online distribution (e.g., downloaded or uploaded) between two user devices (e.g., a smartphone). In the case of online distribution, at least a part of a computer program product (e.g., a downloadable app.) may be temporarily stored or temporarily generated in a storage medium readable by a device, such as a manufacturer's server, an application store's server, or a relay server's memory.

In the above, the disclosed embodiments have been described with reference to the accompanying drawings. Those skilled in the art to which the present invention pertains will understand that the present invention can be implemented in a form different from the disclosed embodiments without changing the technical scope or essential features of the present invention. The disclosed embodiments are illustrative and should not be construed as limiting.

What is claimed is:

1. An electronic device comprising:
   a rectifier that rectifies an input alternating current (AC) voltage into a direct current (DC) voltage;
   an inverter that includes a plurality of switching elements to convert the DC voltage into a three-phase AC voltage and to output the converted three-phase AC voltage to a load;
   a DC linker positioned between the rectifier and the inverter; and
   a controller that controls the inverter to convert the DC voltage into the three-phase AC voltage according to a pulse width modulation (PWM) control signal,
   wherein the controller controls the load:
      to reduce a speed of the load upon detecting a stop signal for the PWM control signal; and
      to stop a driving of the load in response to detecting a link voltage of the DC linker being a minimum value, and
   wherein the controller detects a phase of an input voltage supplied from outside and determines the minimum value of the link voltage based on the detected phase.

2. The electronic device of claim 1, wherein the controller detects a phase of an input power based on any one phase of the three-phase AC voltage of the input power.

3. The electronic device of claim 2, wherein the link voltage has the minimum value at a specific phase of a voltage of a reference phase.

4. The electronic device of claim 3, wherein the controller controls the load to stop the driving of the load at the specific phase of the voltage of the reference phase after reducing the speed of the load, upon detecting the stop signal for the PWM control signal.

5. The electronic device of claim 1, further comprising a converter which is connected to the DC linker to boost the link voltage.

6. The electronic device of claim 5, wherein the converter includes a power factor correction (PFC) circuit.

7. The electronic device of claim 6, wherein the controller reduces the speed of the load and stops the driving of the PFC circuit after a predetermined time has elapsed, upon detecting the stop signal for the PWM control signal.

8. The electronic device of claim 7, wherein the controller controls the load to stop the driving of the load in response to detecting that the link voltage of the DC linker is the minimum value after the driving of the PFC circuit is stopped.

9. A method of controlling an electronic device including a rectifier to rectify an input alternating current (AC) voltage into a direct current (DC) voltage, an inverter including a plurality of switching elements to convert the DC voltage into a three-phase AC voltage and to output the converted three-phase AC voltage to a load, a DC linker positioned between the rectifier and the inverter, and a controller to control the inverter to convert the DC voltage into the three-phase AC voltage according to a pulse width modulation (PWM) control signal, the method comprising:
 detecting a stop signal for the PWM control signal;
 reducing a speed of a load connected to the inverter in response to the detecting of the stop signal; and
 controlling the load to stop a driving of the load in response to detecting a link voltage of the DC linker being a minimum value,
 wherein the controlling of the load includes:
  detecting a phase of an input voltage supplied from outside; and
  determining the minimum value of the link voltage based on the detected phase.

10. The method of claim 9, wherein the controlling of the load includes detecting the phase of an input power based on any one phase of the three-phase AC voltage of the input power.

11. The method of claim 10, wherein the link voltage has the minimum value in a specific phase of a voltage of a reference phase.

12. The method of claim 11, wherein the controlling of the load includes controlling the load to stop the driving of the load at the specific phase of the voltage of the reference phase after reducing the speed of the load, upon detecting the stop signal for the PWM control signal.

13. The method of claim 9, wherein the electronic device further comprises a converter which is connected to the DC linker to boost the link voltage.

14. The method of claim 13, wherein the converter includes a power factor correction (PFC) circuit.

15. The method of claim 14, wherein the controlling of the load includes reducing the speed of the load and stopping the driving of the PFC circuit after a predetermined time has elapsed, upon detecting the stop signal for the PWM control signal.

16. The method of claim 15, wherein the controlling of the load includes controlling the load to stop the driving of the load in response to detecting that the link voltage of the DC linker is the minimum value after the driving of the PFC circuit is stopped.

* * * * *